(12) United States Patent
Weaver et al.

(10) Patent No.: US 7,068,769 B1
(45) Date of Patent: Jun. 27, 2006

(54) METHOD AND SYSTEM FOR COMMUNICATION PROCESSING BASED ON PHYSICAL PRESENCE

(75) Inventors: Farni B. Weaver, Sprint Hill, KS (US); Debashis Haldar, Olathe, KS (US); Piyush Jethwa, Overland Park, KS (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 592 days.

(21) Appl. No.: 09/946,446

(22) Filed: Sep. 4, 2001

(51) Int. Cl.
*H04M 3/42* (2006.01)

(52) U.S. Cl. .............................. 379/201.1; 379/207.12; 709/207; 709/223; 370/235

(58) Field of Classification Search ................ 455/435, 455/414, 412, 413; 709/203–207, 218, 219, 709/223, 200, 217; 370/312, 328, 329, 335, 370/342, 235; 379/265.01, 265.09, 201.01, 379/201.1, 201.11, 207.12, 201.06, 215.01, 379/201.07
See application file for complete search history.

(56) References Cited

U.S. PATENT DOCUMENTS

| | | | | |
|---|---|---|---|---|
| 5,515,426 A * | 5/1996 | Yacenda et al. | ........ | 379/201.07 |
| 5,550,907 A * | 8/1996 | Carlsen | .................. | 379/211.02 |
| 5,652,789 A * | 7/1997 | Miner et al. | ........... | 379/201.01 |
| 5,946,386 A * | 8/1999 | Rogers et al. | ......... | 379/265.09 |
| 6,301,609 B1 * | 10/2001 | Aravamudan et al. | ...... | 709/207 |
| 6,389,127 B1 * | 5/2002 | Vardi et al. | ............ | 379/209.01 |
| 6,430,289 B1 | 8/2002 | Liffick | | |
| 6,446,127 B1 * | 9/2002 | Schuster et al. | ............ | 709/227 |
| 6,477,150 B1 * | 11/2002 | Maggenti et al. | ........... | 370/312 |
| 6,504,921 B1 | 1/2003 | Kotik et al. | | |
| 6,546,096 B1 | 4/2003 | Meiden et al. | | |
| 6,594,354 B1 | 7/2003 | Kelly | | |
| 6,700,967 B1 | 3/2004 | Kleinoder et al. | | |
| 6,799,209 B1 * | 9/2004 | Hayton | ....................... | 709/223 |
| 6,842,505 B1 | 1/2005 | Suder et al. | | |
| 2002/0143877 A1 * | 10/2002 | Hackbarth et al. | | |

OTHER PUBLICATIONS

Degree Projects 2001, http://www.dh.umu.se/degree_proj/2001/de01ma.html, printed from the World Wide Web on Aug. 14, 2001.

(Continued)

*Primary Examiner*—Fan Tsang
*Assistant Examiner*—Md S. Elahee

(57) ABSTRACT

A method and system for using physical presence as a basis to handle communications. A network includes a presence registry that indicates whether users are physically present at stations. Further, the network may include a user-station registry that indicates whether users are logically associated with stations. When a communication server receives a signals indicative of a communication, the server may query the presence registry to determine whether a user is physically present at a station. Based at least on the result of that query, the server may then establish a communication-handling decision, such as a decision of whether and where to route the communication or of some other action to take with respect to the communication. The server or another entity may then carry out the communication-handling decision.

31 Claims, 4 Drawing Sheets

OTHER PUBLICATIONS

Chan, M.C. and Woo, T.Y.C., "Next-Generation Wireless Data Services: Architecture and Experience," *IEEE Personal Communications*, pp. 20-33, Feb. 1999.

Bennett, R. and Rosenberg, J., "Integrating Presence with Multi-Media Communications," dynamicsoft., (2000).

Dynamicsoft Presence Suite, "Carrier-Class Software Infrastructure Solutions for Converged Communications Networks," dynamicsoft., (2001).

Dynamicsoft Application Server, "Redefining Communications in Today's Evolving Market," dynamicsoft., (2001).

* cited by examiner

METHOD AND SYSTEM FOR COMMUNICATION PROCESSING BASED ON PHYSICAL PRESENCE

BACKGROUND

1. Field of the Invention

The present invention relates to telecommunications and, more particularly, to a method and system for processing communications based on physical presence of users.

2. Description of Related Art

In a telecommunications network, a communications destined for a particular user can be routed to an endpoint device with which the user is currently registered. For instance, according to the industry standard Session Initiation Protocol (SIP), each user has a SIP address (which is like an e-mail address; it is a personal identifier of the user). When the user registers with a given SIP client, the SIP client sends a register message up to a SIP server, which records in a registry an association between the user and the SIP client. At any given moment a user (SIP address) can be associated with any number of SIP clients.

When a request comes in to set up a communication session with the SIP user, a SIP INVITE is sent to the SIP server, and the SIP server may refer to the registry, to find out which SIP client(s) the user is currently associated with, i.e., what the network address (or network address identifier (NAI)) is of each SIP client with which the user is currently registered. The SIP server then forwards the SIP INVITE to each such SIP client, requesting to set up the session with the user.

It is known to establish, for a given SIP-user, SIP preferences for various SIP clients. For instance, each SIP client can be given a particular priority level for ring order, so that the SIP server rings them in order. Alternatively, if they all have the same priority level, the SIP server would ring them all at once. Further, a SIP user can have other preference logic, such as to send calls to a particular SIP client at particular times and to another SIP client at other times.

As another example, in instant messaging (IM) systems, each user similarly has a username. When the user logs into an IM system from a given client station (e.g., personal computer), the client station sends up to an IM server a register message, and the IM server then records in an IM registry an association between the user and the client station (e.g., a network address of the client station).

In turn, when another user logs into the IM system and lists the registered user on a "buddy" list, the IM system might send to the other user's station an indication that the registered user is available to receive instant messages. The other user may then send into the network a message destined for the registered user, and the IM server may facilitate sending the message to the client station associated with the registered user.

SUMMARY

The present invention is directed to a method and system for managing communications, based on the physical presence of one or more users at one or more communication stations. In accordance with an exemplary embodiment of the invention, a physical-presence registry (hereafter "presence registry") is maintained in a network. The presence registry indicates, respectively for each of a plurality of stations, whether a user is physically present at the station. Further, the presence registry may be integrated with, or tied functionally to, a user-station registry (or "online registry") that logically associates particular users with particular stations.

Thus, the user-station registry may indicate that a given user is associated with a given station, even if the user is not physically present at the given station. And the presence registry may then indicate that a user is physically present at or absent from the station, or, more particularly, that the given user is physically present at or absent from the station.

For example, a user might operate a client station to log onto a network. As a result, (i) the user-station registry may indicate an association between the user and the station and (ii) the presence registry may indicate that the user is physically present at the station. In turn, the user might physically leave the station without logging off of the network. In that instance, the user-station registry may still indicate that the user is logically associated with the station. However, the presence-registry may then indicate that the user is not physically present at the station.

When the user returns to the station, the presence registry may then indicate that the user is once again physically present at the station.

A distinction thus exists between (i) registering online-association or logical association between a user and a station and (ii) registering physical presence or absence of a user at a station. Namely, the user may be associated with the station even if the user is not physically present at the station. (Note that the word "presence" has been used in the art to describe a user's online-association with a station; the exemplary embodiment, however, uses the word presence to more accurately describe physical or actual attendance, rather than mere logical or online association.)

Also according to the exemplary embodiment, a method and system is provided for determining when a user is physically present at a station and for updating the presence registry when the state of physical presence changes (e.g., from present to absent, or vice versa). One way to do this, for instance, is to monitor the station for user interaction (such as key-presses, voice activity or motion) and to send an update-message into the network in response to the presence or absence of such interaction. The presence registry may then be updated based on the update-message.

Conveniently, a screen saver application can function as the mechanism for detecting the presence or absence of a user. Additionally, in response to user interaction, the screen saver application can prompt a user for a login name and password. In turn, the update message can indicate not only that a user is present at the station, but that a particular user is present at the station. However, other mechanisms for detecting physical-presence are possible as well.

In turn, according to the exemplary embodiment, a method and system is provided for routing or otherwise handling communications based on physical presence. When a network entity receives a communication (e.g., a call, a message, a packet sequence, a session, etc.) that is destined for a particular station and/or for a particular user, the network entity (or another communication-processing entity) may query the presence registry to determine whether a user (e.g., the particular user) is physically present at a designated station. Based on a determination of whether the user is physically present at the station, the network entity may then make a decision of how to handle the communication, such as whether or where to route the communication, or what other action to take with respect to (or in response to) the communication.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN
EXEMPLARY EMBODIMENT

Figure 1:
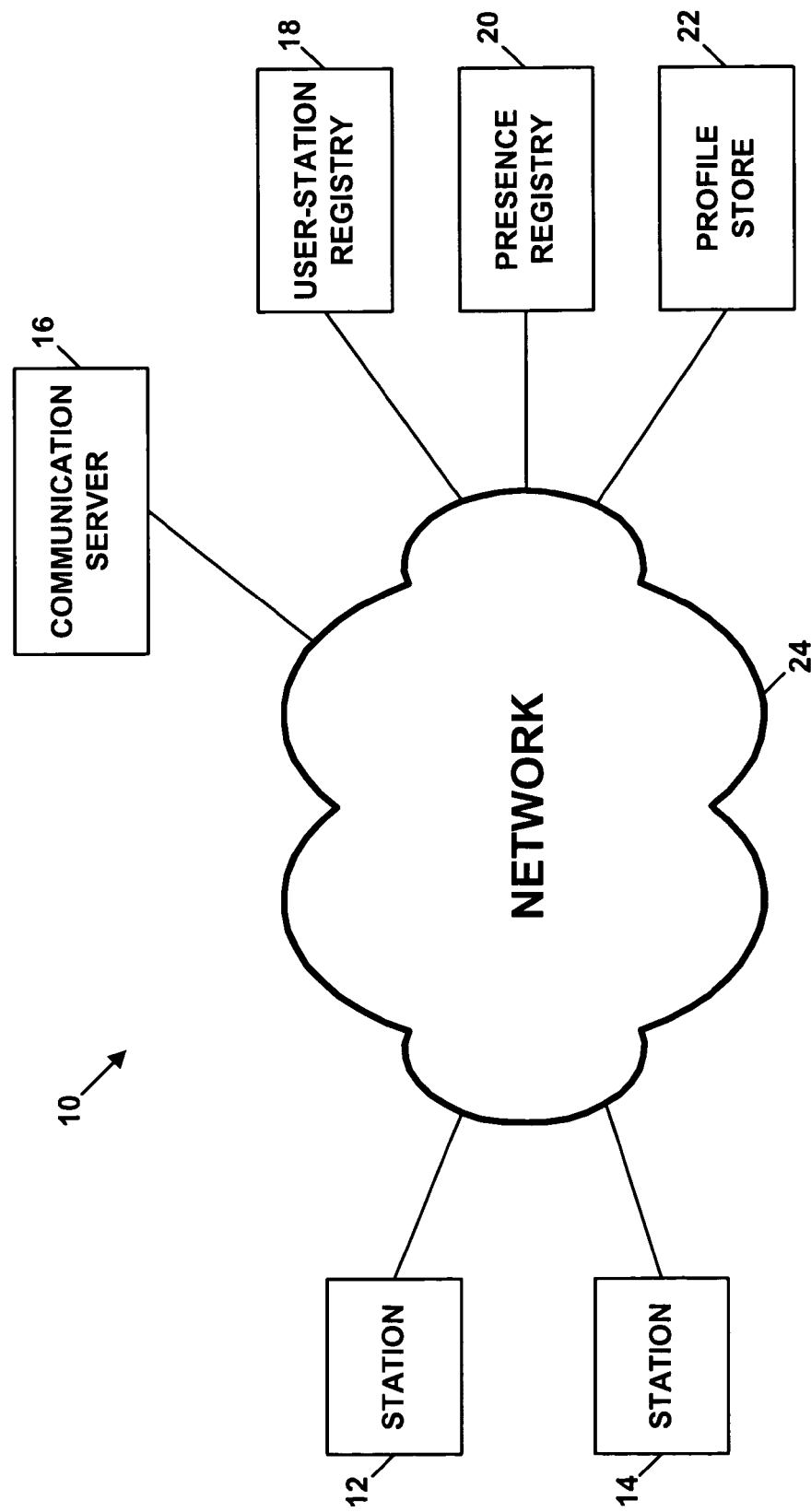
FIG. 1 is a block diagram of a system for employing the exemplary embodiment.

Referring to the drawings, FIG. 1 illustrates a simplified block diagram of a system 10 for employing an exemplary embodiment of the present invention. FIG. 1 depicts a plurality of functional entities, including a first station 12, a second station 14, a communication server 16, a user-station registry 18, a presence registry 20, and a profile store 22. These entities are shown interconnected together via a network 24, which is preferably a packet-switched network or combination of networks (e.g., the Internet) but which could take other forms (such as a circuit-switched telephone network, or a combination of packet-switched and circuit-switched networks for instance).

Of course, this and other arrangements described herein are illustrative only, and other arrangements and other elements (e.g., machines, interfaces, functions, orders of functions, etc.) can be used instead and some elements may be omitted altogether. In this regard, it should be understood that the entities shown in FIG. 1 are functional in nature and, as such, may be physically embodied in a variety of forms and may be implemented as discrete components or in conjunction with other components (whether or not shown), in any suitable combination and location.

For example, the user-station registry 18 and presence registry 20 could be integrated into a single registry, possibly together with the user profile store 22. As another example, multiple user-station registries 18 and/or presence registries 20 could be provided. And as still another example, either or both of these registries could be integrated with the communication server 16.

Each of the stations 12, 14 can take various forms, and the stations might be the same or different types. Examples of suitable stations include personal computers, personal digital assistants (PDAs), landline telephones, cellular telephones, or software applications (e.g., soft-phones, voice mail systems, etc.) running on these or other devices or systems. (It should thus be understood that a "station" as used herein could be a physical device or system, or an application/port in such a device or system.) But other examples are possible as well.

Figure 2:
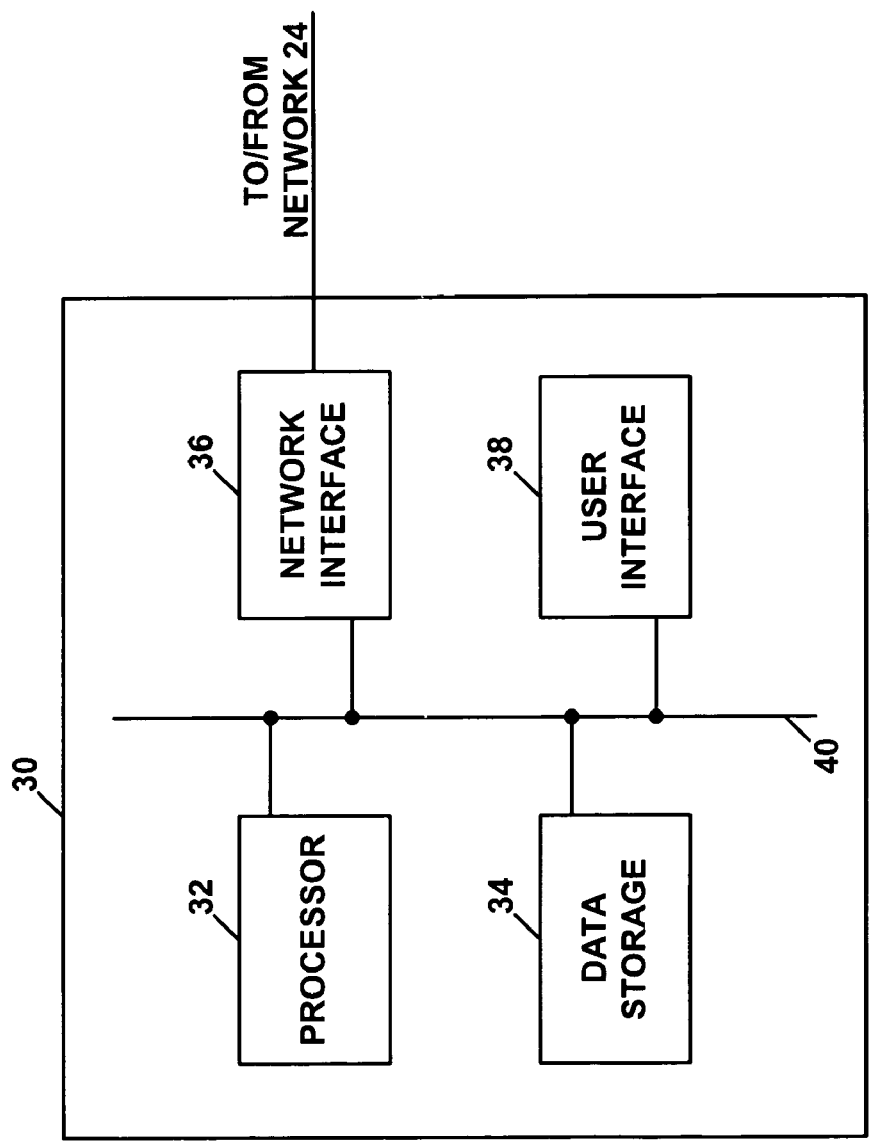
FIG. 2 is a block diagram of a station within the system of FIG. 1.

FIG. 2 is a simplified block diagram of a generalized station 30, depicting elements that can be included in each of the stations 12, 14 shown in FIG. 1. As shown in FIG. 2, the generalized station preferably includes a processor 32, data storage 34, a network interface 36 and a user interface 38, all interconnected by a system bus 40. The data storage 34 may be memory and/or other storage and preferably includes machine language instructions executable by the processor 32 to carry out various functions described herein.

The network interface 36 functions to communicatively couple the station 30 with network 24 and may therefore vary depending on the link between the station and the network (e.g., whether wireless or landline, circuit-switched or packet-switched, etc.) Further, the station might include multiple network interfaces, such as one through which the station sends presence-update messages and another through which the station receives incoming communications.

The user interface 38, in turn, functions to allow user interaction. As such, the user interface 38 might include presentation means, such as a display and/or a speaker, and input means such as a touch-sensitive display, a keyboard, a mouse and/or a microphone. Other examples are possible as well.

According to the exemplary embodiment, the communication server 16 functions to make communication-handling decisions, such as routing decisions, based on physical presence.

Further, the communication server may also function to route or otherwise handle communications in accordance with its communication-handling decisions. Alternatively, one or more separate entities could be provided to enforce (carry out) the communication-handling decisions made by the communication server.

As such, the communication server 16 can take various forms. For example, the communication server can be a switch and/or intelligent router, such as that manufactured by 3Com, Nortel or Lucent. Such a device can be used to aggregate and route communication traffic, and the device can include processing logic that establishes whether and where to route particular communications, based on various factors. In accordance with the exemplary embodiment, at least one such factor will be physical-presence of a user at a station. As another example, the communication server can be a SIP server.

As yet another example, the communication server 16 can be more of a high level communication-processing entity, such as a service control point, a home location register, a service manager, a call agent or a soft switch. As such, the communication server can function mainly to make a communication-handling decisions based on various factors, one of which will be physical-presence of a user at a station. In this arrangement, a communication-processing entity (e.g., switch and/or router) in the network might signal to the communication server during processing of a communication, and the communication server 16 may establish a communication-handling decision and then instruct the processing entity or some other enforcement point to handle the communication according to the decision.

Generally speaking, an exemplary communication server 16 could thus be any computer or processor that functions to make and perhaps carry out communication-handling decisions (such as routing decisions) based on physical-presence.

Figure 3:
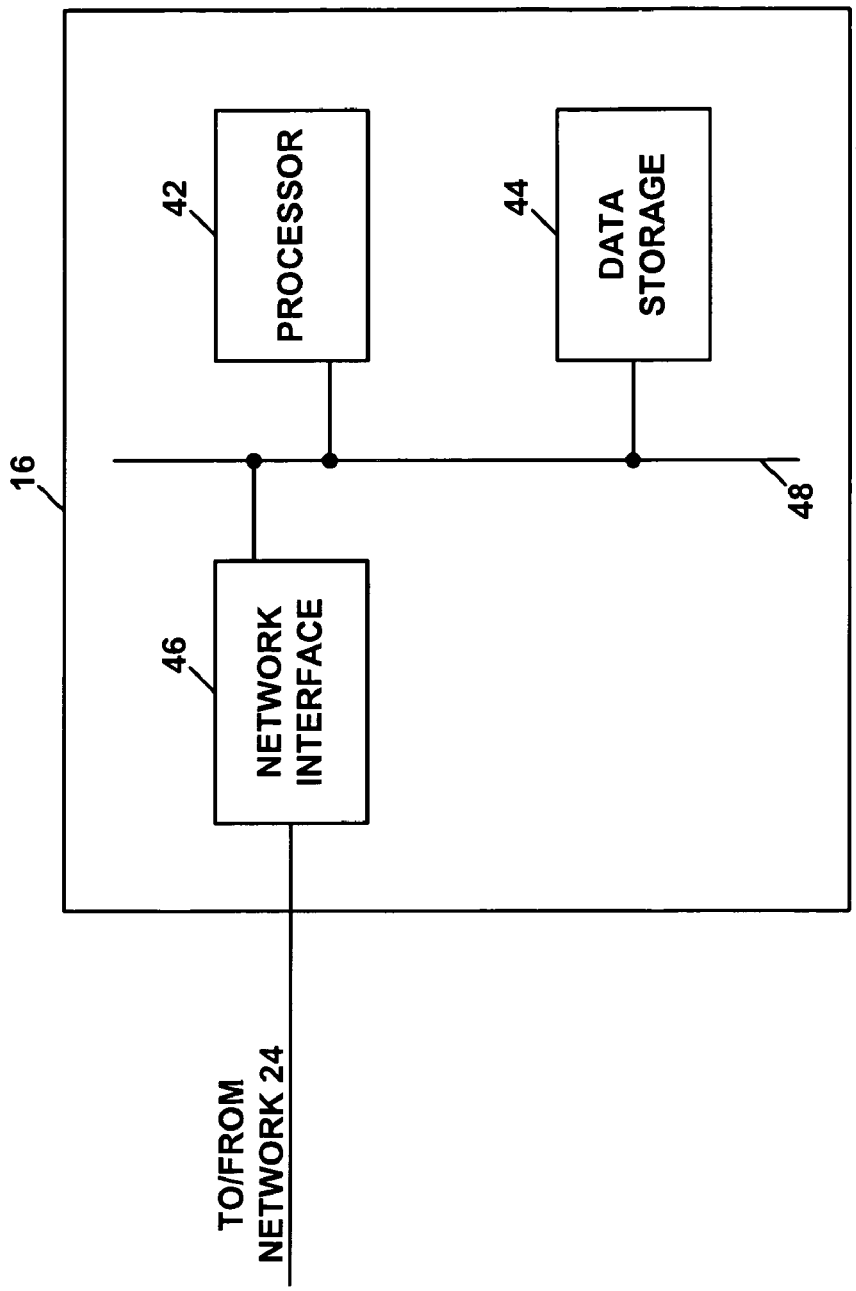
FIG. 3 is a block diagram of a communication server within the system of FIG. 1.

FIG. 3 is a simplified block diagram of one such communication server 16, illustrating some of the functional components that could be included so as to carry out the exemplary embodiment. As shown in FIG. 3, exemplary server 16 includes a processor 42, data storage 44, and a network interface 46, interconnected together by a system bus 48. The data storage 44 may be memory and/or other storage and preferably includes machine language instructions executable by processor 42 to carry out various functions described herein. And the network interface functions to communicatively link the server with network 24.

In accordance with the exemplary embodiment, the user-station registry 18 maintains records that logically associate users with stations, indicating, for instance, the station(s) at which each user has logged onto the network. As such, an exemplary user-station registry can take the form of a database (e.g., a flat file or more complex database, the particular form of which is not critical). The database can include an indication per user of at least one station with which the user is currently registered. Alternatively or additionally, the database can include an indication per station of at least one user who is currently registered to be using the station.

In this regard, each user may have a respective username (e.g., a SIP address, an IM username, etc.), and each station may have a respective network address (e.g., MAC address, or, alternatively, a station identifier that can be correlated with an address) indicating where the station is located in the network 24. The user-station registry 18 may then tie together a given username with a given network address, indicating that the respective user is associated with the respective station.

That way, if communication server 16 receives a request to route a communication to a given user, the server 16 can query the user-station registry 18 to identify the station with which the user is registered. (And the server can then refer to the presence registry 20 to determine whether a user (e.g., the user) is physically present at that station.) Further, if the communication server receives a request to route a communication to a particular station, the server 16 can query the user-station registry 18 to determine which user is currently associated with the station. (And the server can then refer to the presence registry 18 to determine whether that user is physically present at a station (e.g., that station)).

In the exemplary embodiment, a user-station server (not shown) can be in place on network 24 to manage the user-station registry 18. Thus, when an entity such as communication server 16 seeks to query the user-station registry, the entity can send a query message to the user-station server, and the user-station server can query the user-station registry accordingly and provide a response signal to the entity. Alternatively, the communication server 16 itself can embody the user-station server.

The presence registry 20, in turn, preferably maintains records that indicate whether users are physically present at stations. As such, an exemplary presence registry can similarly take the form of a database. The database can include an indication, for each user (e.g., per username), of whether the user is physically present at a station, as well as an identification of a station at which the user is physically present. Further, the database can include, for each station, an indication of whether a user (e.g., any user, or a particular user) is physically present at the station, as well as an indication of which user (e.g., by username) is currently present at the station.

As with the user-station registry, a presence server (not shown) can be in place on network 24 to manage the presence registry 20. Thus, when an entity such as communication server 16 seeks to query the presence registry, the entity can send a query message to the presence server, and the presence server can query the presence registry accordingly and provide a response signal to the entity. Alternatively, the communication server 16 itself can embody the presence server. Further, the presence server and user-station server could be embodied in a common entity.

The profile store 22, in turn, preferably maintains logic that indicates communication-handling preferences per user and/or per station. As such, the logic for each user and/or station may take the form of one or more database records or linked-list nodes that establish how to handle a communication destined for the user and/or station. In the exemplary embodiment, this logic will be keyed to physical presence as indicated in the presence registry 20. I.e., the decision of how to handle the communication will be based at least in part on a determination of whether a given user is said to be physically present at a given station. But the logic may be keyed to other factors as well (i.e., in addition to physical presence).

As such, the communication-handling logic can take a variety of forms. By way of example, the logic may indicate whether or where to route a communication destined for a given user, based on whether the given user is physically present at a particular station (as indicated by the presence registry 20). Examples of such logic include the following:

(1) If the user is physically present at station 12, the communication should be routed to station 12;

(2) If the user is physically present at station 12, the communication should not be routed to station 12;

(3) If the user is physically present at station 12, the communication should be sent to station 14;

(4) If the user is not physically present at station 12, the communication should be sent to station 12;

(5) If the user is not physically present at station 12, the communication should not be sent to station 12; and (6) If the user is not physically present at station 12, the communication should be sent to station 14.

These or other instances of logic can be keyed further to the station with which the given user is presently associated (as indicated by the user-station registry 18 and/or the presence registry 20 for instance). For example, the logic might indicate as follows:

(7) If the user is associated with station 12 and is physically present at station 12, the communication should be routed to station 12; or (8) If the user is associated with station 14 and is physically present at station 12, the communication should be routed to station 12.

Further, these or other instances of communication-handling logic can be keyed to the identity and/or physical presence of one or more particular users, whether or not either user is the addressee of the communication. For example, the logic might indicate:

(9) A communication destined for user JohnDoe should be routed to station 14 if user JohnDoe is physically present at station 14;

(10) A communication destined for user JaneSmith should be routed to station 12 if user JaneSmith is physically present at station 14;

(11) A communication destined for user JohnDoe should be routed to station 12 if user JaneSmith is physically present at station 14; or

(12) A communication destined for JohnDoe should be routed to station 14 if both (i) JohnDoe is physically present at station 14 and (ii) JaneSmith is physically present at station 12.

Still further, these or other instances of communication-handling logic can be keyed more generally to physical presence at one or more stations, without regard to the identity of a particular user. For instance, the logic can provide:

(13) If any user is physically present at station 12, the communication should be routed to station 12;

(14) If any user is physically present at station 12, the communication should be routed to station 14;

(15) If no user is physically present at station 12, the communication should be routed to station 12;

(16) If no user is physically present at station 12, the communication should be routed to station 14; or

(17) If any user is physically present at station 12 and any user is physically present at station 14, the communication should be routed to station 14.

Yet further, an instance of communication-handling logic could be keyed to additional factors, such as date/time, prepayment account balance (as in prepaid telephony or prepaid data communications), or type of communication (e.g., e-mail, voice, etc.) for instance. Examples of such logic include:

(18) If JohnDoe is physically present at station 12 and the time of day is between 7:00 p.m. and 10 p.m., the communication should be routed to station 12;

(19) If JaneSmith is physically present at station 14 and JaneSmith's prepaid account balance includes at least 5 minutes of talk-time, the communication should be routed to station 14; and

(20) If the communication is an e-mail message to user X, and user X is not physically present at a station, route the communication to user Y.

And yet further, an instance of communication-handling logic can also be keyed to the originating station or user and/or to the intended destination of the given communication.

Examples of such logic include:

(21) If a communication from JohnDoe is destined for station 12 and no user is physically present at station 12, the communication should be routed to station 14;

(22) If a communication is destined for JaneSmith and JaneSmith is not physically present at any station, the communication should be routed to station 12; and

(23) If a multicast communication is destined for stations 12 and 14 and no user is physically present at either station 12 or station 14, the communication should be routed to user JaneSmith.

Each of the foregoing examples of communication-handling logic provides a routing decision, such as whether and where to route the communication. Alternatively or additionally, the communication-handling logic may specify one or more other actions to take based on physical presence. Examples of other suitable actions include: (i) holding the communication for later delivery, (ii) converting the communication to some other form (e.g., converting from speech to text or from text to speech) for immediate or later delivery, and (iii) generating and sending an informational-message or signal to another entity (e.g., sending an SMS message or e-mail to a designated recipient, advising the recipient about the communication). Other examples are possible as well.

In the exemplary embodiment, the profile store 22 can be maintained by the communication server 16, or the profile store 22 can be maintained by some other entity, similar to the user-station registry 18 and presence registry 20. For instance, the profile store 22, user-station registry 18 and presence registry 20 could all be maintained by a common server.

In accordance with the exemplary embodiment, system 10 then includes a mechanism for determining whether a user is physically present at a station (such as station 12 and/or station 14) and for updating the presence registry 20 to reflect change in state of physical presence (or to newly record a presence state). This mechanism can take various forms.

One way of determining whether a user is physically present at a station is to monitor the station to determine when a user is interacting with the station. If user interaction is occurring, a conclusion can logically be drawn that a user is physically present at the station. On the other hand, if user interaction is not occurring or has not occurred for a threshold period of time, a conclusion can logically be drawn that a user is not physically present at the station. Other ways include applying a motion detector or other such monitoring mechanism at or near the station.

Generally speaking, the presence-conclusion can thus be that a user is either "present" (physically present) or "not present" not physically present) at the station. Alternatively, the conclusion can be that presence-state has changed, i.e., that a user was not present but is now present, or that a user was present but is no longer present.

It is understood that these presence-conclusions of are matters of judgement and therefore may not be accurate or correct in all instances. For instance, it is possible that a user might not interact with a station for at least a threshold period of time, and so the conclusion might be that the user is not physically present at the station—even if the user actually remains physically at the station. The important point in that instance would be that a determination of physical presence was made.

The process of determining whether user a user is interacting with a station can itself also take various forms, which may depend on the arrangement of the station at issue. For instance, if the station includes a keyboard, keypad or other user input mechanism, the process may involve monitoring the user input mechanism to determine whether the user is currently using the mechanism.

Conveniently, one way to do his is through use of a screen-saver application, as found commonly on many personal computers and other such stations. Conventionally, a screen-saver application is executed by a processor in the station and operates to change or turn off a display-image after a set period of inactivity, i.e., once a period of time (e.g., 10 minutes) has elapsed without a user pressing any keys on a keyboard or moving a mouse or other input device. In turn, the screen-saver application might then resume the display image once a user then presses any key or moves the input device (thereby interrupting the screen-saver application). Thus, a conventional screen-saver application can be used to detect presence or absence of a user at a station, i.e., to make a presence-conclusion.

In accordance with the exemplary embodiment, when the station makes a presence-conclusion, the station will send a signaling message into the network so as to update the presence registry 20. For instance, the station may send to the presence server a presence-update message, and the presence-server may then update the presence registry 20 accordingly. This can be done with the screen-saver arrangement described above, by modifying the screen saver application so as to generate and send a presence-update message in response to each presence-conclusion that it makes. Thus, when a user does not interact with the input mechanism for the set period of time, the screen-saver application might generate a "not present" message and cause the station to send the message via the network 24 to the presence server 20.

Preferably, the presence-update message indicates a presence-state for the station, i.e., whether or not a user is physically present at the station. Further, the presence-update message may indicate the identity of the user at the station, so that the presence registry can correlate the presence-state with that particular user.

In order to be able to include the identity of the user, the station may maintain in its data storage 34 an indication of which user is currently associated with the station, so the station can refer to that indication to find out the identity of the user. (As with the presence-conclusions described above, it is possible that this identity might be incorrect. For instance, if the registered user leaves the station and another person interacts with the station, a conclusion might be drawn that the registered user is physically present. In this instance, the important consideration is that a user was identified, even if erroneously.)

Alternatively, a more accurate way to identify the user is to require the user to enter some authentication information. For instance, with a screen-saver arrangement as described above, the screen saver might be configured to prompt a user to provide the user's username and password (or other authentication credentials) before resuming the display image. The screen-saver application might then validate the username and password and responsively conclude that the user is properly identified by the username. Thus, the application may then include the username as a parameter in the presence-update message.

The presence-update message may take various forms. By way of example, the message can be an HTTP message, an XML message, or any other type of message. Preferably, the message will include parameters in a format that the presence server is programmed to read. The presence server is then preferably programmed to update the records in the presence registry 20 accordingly.

In turn, according to the exemplary embodiment, system 10 includes a mechanism for making a communication-handling decision based at least in part on physical presence as indicated by the presence registry 20, and for carrying out (or causing to be carried out) that communication-handling decision.

In the exemplary embodiment this mechanism is preferably a set of logic carried out by the communication server 16. In particular, the communication server 16 will receive a signal associated with a communication and will responsively apply a set of logic to make a communication-handling decision. The logic may be that defined by the profile store 22 and/or may be logic maintained by the server 16 or otherwise accessible. Further, the server 16 could outsource the logic, such as by sending a function call to a remote entity that carries out the logic.

The signal associated with the communication can take various forms. For instance, it can be a signal associated with initiation (setup) of the communication, such as the initiation of a communication session. Examples of such signals include SIP INVITE messages, ISUP call setup messages, TCAP messages, Origination-Request messages, and the like. Alternatively, the signal can be associated with ongoing control of the communication, such as a bandwidth-adjustment signal, or a prepayment-decrementing signal. Still alternatively, the signal can be some or all of the communication itself, such as one or more packets representing the communication. Other examples are possible as well.

In the exemplary embodiment, the signal will identify one or more parameters about the communication. Examples of these parameters include (i) originating identifier (e.g., SIP address of originating party, username of originating party, or network address or identifier of originating station), (ii) destination identifier (e.g., SIP address of destination party, username of destination party, or network address or identifier of destination station), (iii) communication session ID, and (iv) type of communication (e.g., SIP, SMS message, e-mail, voice over IP, HTTP, FTP, etc.)

In response to one or more parameters carried by the signal, the communication server 16 will programmatically refer to the presence registry, and possibly to the user-station registry and/or profile store as well, in order to make a communication-handling decision keyed to at least physical presence.

For example, if the signal indicates that the communication is destined for user X, server 16 may query the user-station registry and determine that user X is currently associated with stations 12 and 14 (e.g., X is registered as being online at both stations 12 and 14). In turn, server 16 may query the presence registry and determine that user X is physically present at station 14 and that no user is physically present at station 12. The server may then apply communication handling logic defined by the profile store to establish that, in the situation where user X is physically present at station 14 and no user is physically present at station 12, a communication destined for user X should be routed to station 12.

In turn, the communication server 16 may then carry out the communication-handling decision, by carrying out the decision itself or by sending a message to another entity to cause the communication-handling decision to be carried out. For instance, continuing with the above example, for instance, if the server 16 is a switch/router, it may route the communication to station 12. Alternatively, if the server 16 is a more high level communication-processing entity such as a service agent for instance, the communication-processing entity could send a message to a switch/router or other entity, instructing the switch/router or other entity to route the communication to station 12.

Figure 4:
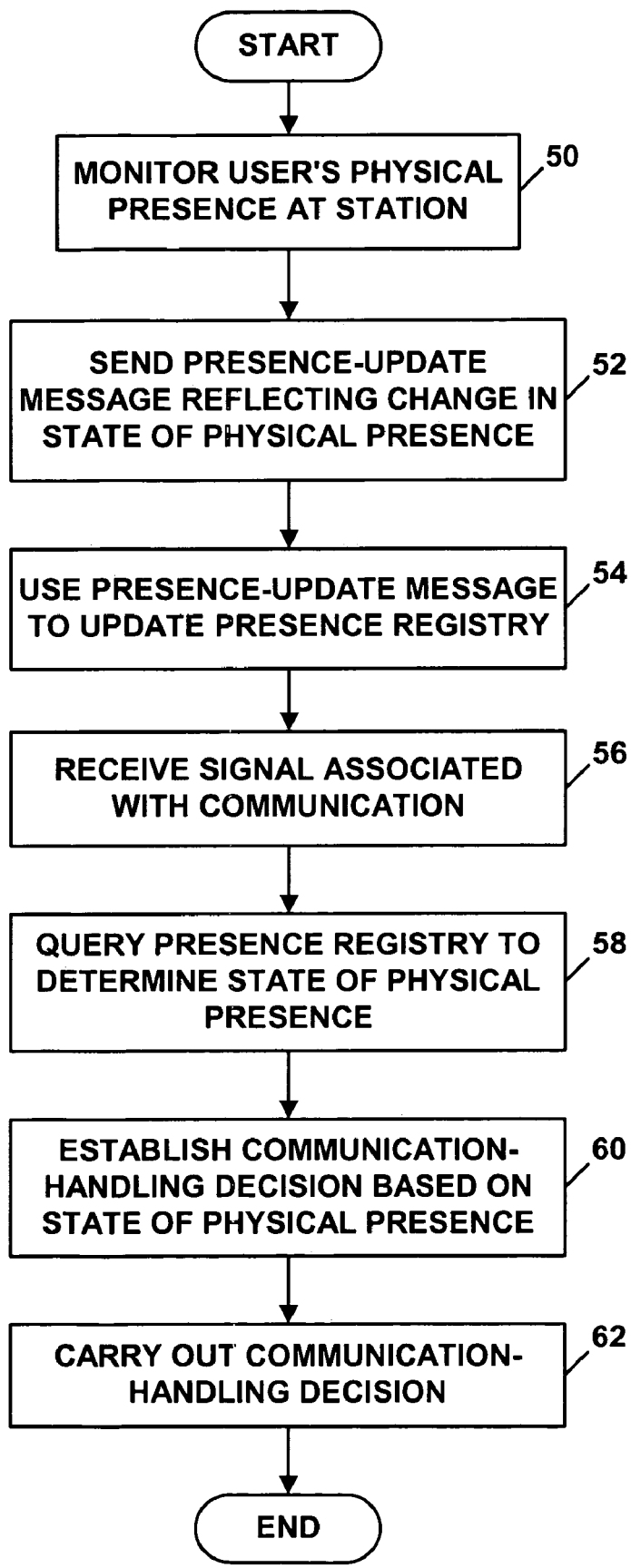
FIG. 4 is a flow chart depicting functions that may be carried out according to the exemplary embodiment.

Thus, referring now to FIG. 4, a flow chart is provided to help illustrate a set of functions that can be carried out in accordance with the exemplary embodiment. As shown in FIG. 4, at block 50, a user's physical presence at a station is monitored. At block 52, in response to a change in state of physical presence at the station, the station sends a presence-update message. And, at block 54, the presence-update message is used to update a presence registry so as to reflect the state of physical presence of the user and/or the station.

At block 56, a communication server then receives a signal associated with a communication. In response, at block 58, the communication server queries the presence registry to determine whether a user is physically present at a station (as reflected by the presence registry). In turn, at block 60, the communication server applies a set of communication-handling logic to establish a communication-handling decision that is keyed to at least the state of physical presence. At block 62, the communication server or another entity then carries out the communication-handling decision.

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:

detecting whether a user is physically present at a particular station, wherein detecting whether the user is physically present at the particular station includes (i) detecting user interaction with a user-interface of the particular station and concluding that the user interaction indicates that the user is physically present at the particular station and (ii) determining an identity of the user interacting with the user-interface, wherein determining the identity of the user interacting with the user-interface comprises prompting the user to input a username;
responsively sending an indication of whether the user is physically present at the particular station;
receiving the indication of whether the user is physically present at the particular station;
storing the indication in a registry;
receiving into a network entity a signaling message associated with an incoming communication for the user;
responsive to the signaling message, the network entity making a determination of whether the user is physically present at the particular station, wherein making the determination of whether the user is physically present at the particular station comprises consulting the registry to determine the indication;
based at least in part on the determination, the network entity making a communication-routing decision using routing logic that indicates choices between the particular station and another station; and
the network entity carrying out the communication-routing decision.

2. The method of claim 1, wherein receiving a signaling message associated with the incoming communication comprises receiving a communication initiation message.

3. The method of claim 1, wherein receiving a signaling message associated with the incoming communication comprises receiving at least a portion of the communication.

4. The method of claim 1, wherein the communication-routing decision comprises a decision to route the communication to the user.

5. The method of claim 1, wherein the communication-routing decision comprises a decision to not route the communication to the user.

6. The method of claim 1, wherein the communication-routing decision comprises a decision to route the communication to another user.

7. The method of claim 1, wherein the communication-routing decision comprises a decision to route the communication to the particular station.

8. The method of claim 1, wherein the communication-routing decision comprises a decision to not route the communication to the particular station.

9. The method of claim 1, wherein the communication-routing decision comprises a decision to route the communication to another station.

10. A method comprising:
running a screen-saver application on a particular station;
detecting whether a user is physically present at the particular station, wherein detecting whether the user is physically present at the particular station comprises detecting user interaction with a user-interface of the particular station, and wherein detecting user interaction with a user-interface of the particular station comprises detecting user interruption of the screen-saver application;
responsively sending an indication of whether the user is physically present at the particular station;
receiving the indication of whether the user is physically present at the particular station;
storing the indication in a registry;
receiving into a network entity a signaling message associated with an incoming communication for the user;
responsive to the signaling message, the network entity making a determination of whether the user is physically present at the particular station, wherein making the determination of whether the user is physically present at the particular station comprises consulting the registry to determine the indication;
based at least in part on the determination, the network entity making a communication-routing decision using routing logic that indicates choices between the particular station and another station; and
the network entity carrying out the communication-routing decision.

11. The method of claim 10, further comprising:
prompting the user to input a username upon interruption of the screen-saver application,
wherein the indication of whether the user is physically present at the particular station comprises an indication of the username as well as an indication of whether the user is physically present at the particular station.

12. The method of claim 10, wherein receiving a signaling message associated with the incoming communication comprises receiving a communication initiation message.

13. The method of claim 10, wherein receiving a signaling message associated with the incoming communication comprises receiving at least a portion of the communication.

14. The method of claim 10, further comprising determining that the user is logically associated with the particular station.

15. The method of claim 14, wherein determining that the given user is logically associated with the particular station comprises querying a user-station registry to determine that the given user is logically associated with the particular station.

16. The method of claim 10, wherein the communication-routing decision comprises a decision to route the communication to the user.

17. The method of claim 10, wherein the communication-routing decision comprises a decision to not route the communication to the user.

18. The method of claim 10, wherein the communication-routing decision comprises a decision to route the communication to another user.

19. The method of claim 10, wherein the communication-routing decision comprises a decision to route the communication to the particular station.

20. The method of claim 10, wherein the communication-routing decision comprises a decision to not route the communication to the particular station.

21. The method of claim 10, wherein the communication-routing decision comprises a decision to route the communication to another station.

22. A method comprising:
receiving into a network entity a signaling message associated with an incoming communication for a user;
responsive to the signaling message, the network entity making a determination of whether the user is physically present at the particular station;
based at least in part on the determination, the network entity making a communication-routing decision using routing logic that indicates choices between the particular station and another station; and
the network entity carrying out the communication-routing decision,
wherein the signaling message comprises a SIP INVITE message that indicates a SIP address of the user, and wherein the method further comprises: in response to the signaling message, querying a SIP server to determine that the SIP address is currently associated with a given station.

23. The method of claim 22, wherein making a determination that the user is physically present at the particular station comprises querying a network-based presence registry to determine that the user is physically present at the given station.

24. The method of claim 22, wherein receiving a signaling message associated with the incoming communication comprises receiving a communication initiation message.

25. The method of claim 22, wherein receiving a signaling message associated with the incoming communication comprises receiving at least a portion of the communication.

26. The method of claim 22, wherein the communication-routing decision comprises a decision to route the communication to the user.

27. The method of claim 22, wherein the communication-routing decision comprises a decision to not route the communication to the user.

28. The method of claim 22, wherein the communication-routing decision comprises a decision to route the communication to another user.

29. The method of claim 22, wherein the communication-routing decision comprises a decision to route the communication to the particular station.

30. The method of claim 22, wherein the communication-routing decision comprises a decision to not route the communication to the particular station.

31. The method of claim 22, wherein the communication-routing decision comprises a decision to route the communication to another station.

* * * * *